United States Patent
Okamoto

(10) Patent No.: US 7,418,601 B2
(45) Date of Patent: Aug. 26, 2008

(54) DATA TRANSFER CONTROL SYSTEM

(75) Inventor: Masayoshi Okamoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 893 days.

(21) Appl. No.: 10/456,239

(22) Filed: Jun. 6, 2003

(65) Prior Publication Data
US 2004/0049692 A1     Mar. 11, 2004

(30) Foreign Application Priority Data
Jun. 18, 2002   (JP)   ............... 2002-176627

(51) Int. Cl.
*G06F 11/00* (2006.01)
*G06F 12/14* (2006.01)
*H04L 9/32* (2006.01)

(52) U.S. Cl. .............. 713/193; 713/600; 348/207.1
(58) Field of Classification Search ........... 380/287; 348/207.1; 713/193, 150, 600
See application file for complete search history.

(56) References Cited

U.S. PATENT DOCUMENTS

| | | | | |
|---|---|---|---|---|
| 5,506,617 A | * | 4/1996 | Parulski et al. | 348/207.99 |
| 5,543,885 A | * | 8/1996 | Yamano et al. | 396/300 |
| 6,256,063 B1 | * | 7/2001 | Saito et al. | 348/231.99 |
| 6,690,415 B1 | * | 2/2004 | Mamiya | 348/207.1 |
| 2002/0169928 A1 | * | 11/2002 | Kimura et al. | 711/137 |
| 2003/0048365 A1 | * | 3/2003 | Saito et al. | 348/231.7 |

FOREIGN PATENT DOCUMENTS

| | | | |
|---|---|---|---|
| EP | 848548 A2 | * 6/1998 | |
| JP | 01-322317 | 12/1989 | |
| JP | 03-180565 | 6/1991 | |
| JP | 05-289852 | 10/1993 | |
| JP | 07-171717 | 7/1995 | ............ 3/6 |
| JP | 11-076863 | 3/1999 | |
| JP | 11-092834 | 3/1999 | |
| JP | 11-228874 | 8/1999 | |
| JP | 2001-211356 | * 8/2001 | |

* cited by examiner

Primary Examiner—Gilberto Barron, Jr.
Assistant Examiner—Samson B Lemma
(74) Attorney, Agent, or Firm—Gerald T. Bodner

(57) ABSTRACT

A data transfer control system includes a PC and a camera, and these are connected by a USB cable in a manner capable of making a communication with each other. Prior to a data transfer, the PC instructs the camera that it is impossible to cut-off, that is, to prohibit a connected state (connection state) from being released. In receipt thereof, the camera turns-on a cut-off-impossible lamp. Upon completion of the data transfer and a transfer of FAT data, the PC instructs the camera that it is allowed to cut-off, that is, to allow to release the connection state. In receipt thereof, the camera turns-off the cut-off-impossible lamp.

5 Claims, 14 Drawing Sheets

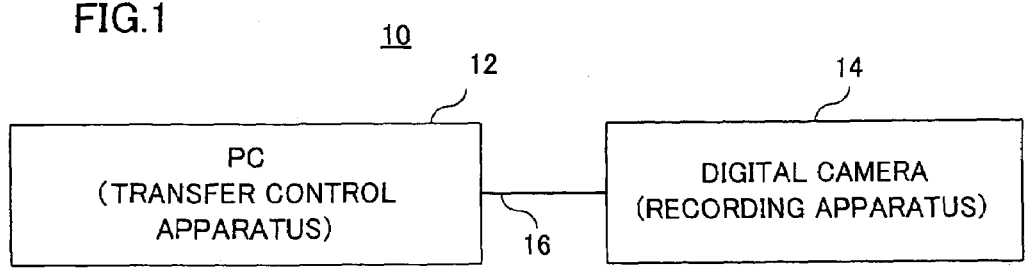
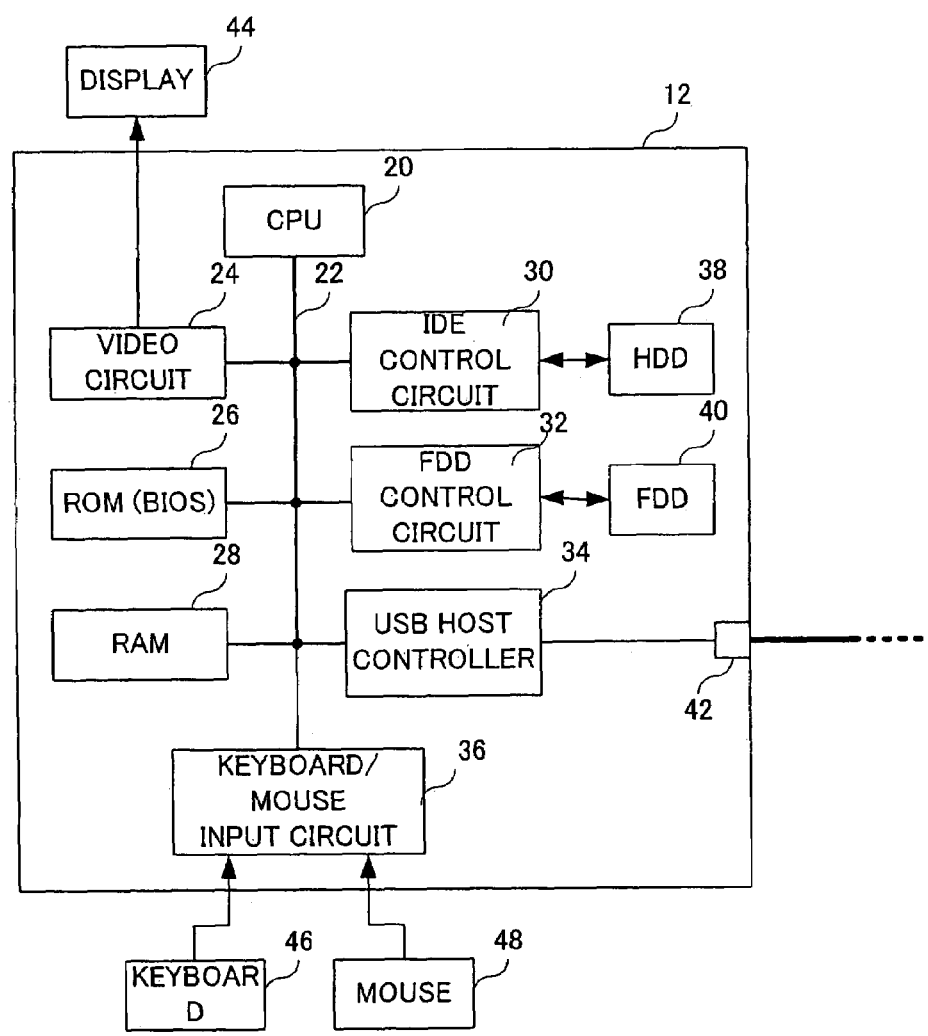

FIG.5

(A) CBW (Command Block Wrapper)

| Bit<br>Byte | 7 | 6 | 5 | 4 | 3 | 2 | 1 | 0 |
|---|---|---|---|---|---|---|---|---|
| 0-3 | dCBWsignature ||||||||
| 4-7 | dCBWTag ||||||||
| 8-11 | dCBWDataTransferLength ||||||||
| 12 | bmCBWFlag ||||||||
| 13 | Reserved |||| bCBWLUN ||||
| 14 | Reserved |||| bCBWCBLength ||||
| 15-30 | CBWCB (16 bytes) ||||||||

(B) CBWCB (Command Block OF CBW)(BASIC FORMAT)

| Bit<br>Byte | 7 | 6 | 5 | 4 | 3 | 2 | 1 | 0 |
|---|---|---|---|---|---|---|---|---|
| 0 | Operation Code ||||||||
| 1-11 | Operation Data<br>(FORMAT IS BASED ON CONTENT OF Operation Code) ||||||||
| 12-15 | Not Used ||||||||

FIG.6

REQUEST OF BEING ALLOWED TO CUT-OFF/IMPOSSIBLE TO CUT-OFF

| Bit<br>Byte | 7 | 6 | 5 | 4 | 3 | 2 | 1 | 0 |
|---|---|---|---|---|---|---|---|---|
| 0 | Operation Code (F8h)<br>[ALLOWED TO CUT-OFF/IMPOSSIBLE TO CUT-OFF] | | | | | | | |
| 1 | Logical Unit Number | | | 0 | 0 | Reserved | | 0 |
| 2 | Reserved | | | | | | | ALLOW bit |
| 3 | Reserved | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12-15 | Not Used | | | | | | | |

ALLOW bit { 0: IMPOSSIBLE TO CUT-OFF
1: ALLOWED TO CUT-OFF

FIG.14

(A) CSW( Command Status Wrapper)

| Bit<br>Byte | 7 | 6 | 5 | 4 | 3 | 2 | 1 | 0 |
|---|---|---|---|---|---|---|---|---|
| 0-3 | dCSWsignature ||||||||
| 4-7 | dCSWTag ||||||||
| 8-11 | dCSWDataResidue ||||||||
| 12 | CSWStatus ||||||||

(B) CSWStatus

| VALUE | CONTENTS |
|---|---|
| 00h | Command Passed ("good status") |
| 01h | Command Failed |
| 02h | Phase Error |
| 03h,04h | Reserved |
| 05h-FFh | Reserved |

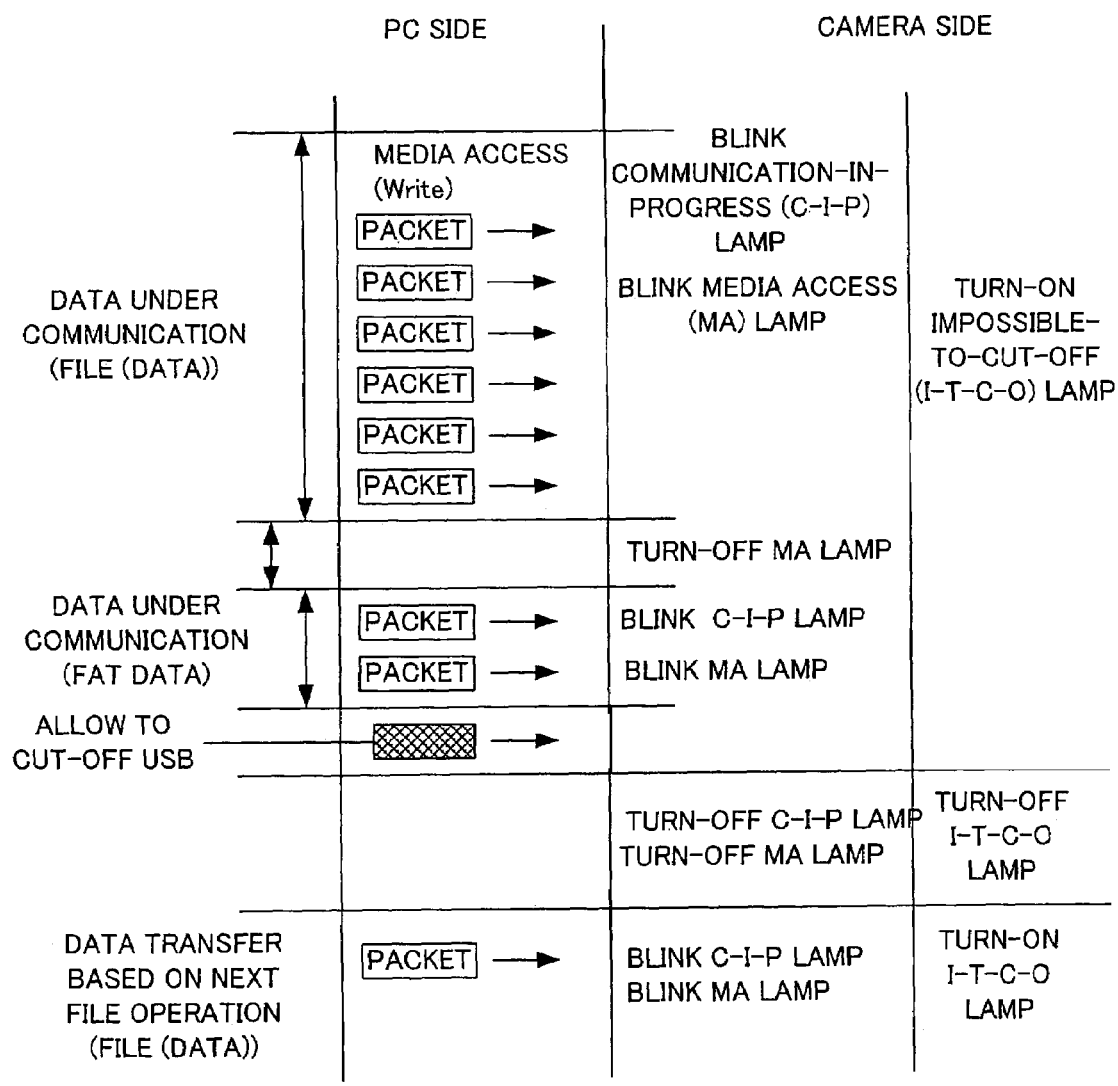

DATA TRANSFER CONTROL SYSTEM

BACKGROUND OF THE INVENTION

1. Field of the Invention

The present invention relates to a data transfer control system. More specifically, the present invention relates to a transfer control system and a data transfer control method provided with a recording apparatus, and a transfer control apparatus that is connected to the recording apparatus in a manner capable of making a communication with each other, and transfers data to the recording apparatus.

2. Description of the Prior Art

One example of such a kind of a conventional data transfer control system is disclosed in Japanese Patent Laying-open No. 2001-211356 [H04LN 5/225, 5/907, 5/91, 5/92] laid-open on Aug. 3, 2001. In this prior art, an electronic camera is connected to an external device such as a personal computer, and etc. via a USB (Universal Serial Bus) terminal, and a transfer of data such as an image, an instruction, and etc. is performed therebetween. When a media access is performed by a USB mode, a user is notifed that a communication is being made by performing a predetermined display and a sound output using an attachment such as a finder lamp, a self-timer lamp, a liquid crystal monitor or a speaker, and etc. provided on the camera.

However, in a case of making a file (data) transfer to a memory card attached to the electronic camera from the personal computer, there was a possibility that it is determined that the file transfer is completed before the recording of the FAT data regarding the transferred data is ended. That is, upon completion of transferring and recording the data, the transfer and a recording of the FAT data are executed thereafter. However, there is also a case that the recording of the FAT data is started after 10 seconds passed after transferring the data, for example. At this time, if the USB cable is disconnected, that is, a connection state between the personal computer and the electronic camera is released, it becomes impossible to record the FAT data. This results in a problem that the transferred data cannot be reproduced and so forth.

SUMMARY OF THE INVENTION

Therefore, it is a primary object of the present invention to provide a novel data transfer control system and a data transfer control method.

It is another object of the present invention to provide a data transfer control system and a data transfer control method capable of normally transferring data.

It is still another object of the present invention to provide a recording apparatus used for a novel data transfer control system or a data transfer control method.

It is another object of the present invention to provide a transfer control system used for a novel data transfer control system or a data transfer control method.

A first invention is a data transfer control system provided with a recording apparatus, and a transfer control apparatus connected to the recording apparatus in a manner capable of making a communication therebetween and transferring to the recording apparatus data and managing information of the data, characterized in that the transfer control apparatus comprises a prohibiting signal transmitter for transmitting, prior to a transfer of the data, to the recording apparatus a prohibiting signal to prohibit a connection state from being released; and an allowing signal transmitter for transmitting to the recording apparatus an allowing signal to allow to release the connection state when the transfer of the data is completed and a transfer of the managing information is also completed, and the recording apparatus comprises a cutting-off-impossible notifier for notifying of being impossible to cut-off in response to a reception of the prohibiting signal, and a cutting-off-allowing notifier for notifying of being allowed to cut-off in response to a reception of the allowing signal.

A second invention is a data transfer control system provided with a recording apparatus, and a transfer control apparatus connected to the recording apparatus in a manner capable of making a communication therebetween and transferring to the recording apparatus data and managing information of the data, characterized in that the transfer control apparatus comprises an allowing signal transmitter for transmitting to the recording apparatus an allowing signal to allow to release a connection state when a transfer of the data is completed and a transfer of managing information is also completed, and the recording apparatus comprises a cutting-off-impossible notifier for notifying of being impossible to cut-off the connection state in response to a beginning of reception of the data, and a cutting-off-allowing notifier for notifying of being allowed to cut-off the connecting state in response to a reception of the allowing signal.

A third invention is a transfer control apparatus that transfers to a recording apparatus externally connected data and managing information of the data, characterized in that the transfer control apparatus comprises a prohibiting signal transmitter for transmitting to the recording apparatus a prohibiting signal to prohibit a connection state from being released prior to a transfer of the data, and an allowing signal transmitter for transmitting to the recording apparatus an allowing signal to allow to release the connection state when the transfer of the data is completed and a transfer of the managing information is also completed.

A fourth invention is a recording apparatus that records data and managing information of the data both transferred from a transfer control apparatus externally connected, comprising: a cutting-off-impossible notifier for notifying of being impossible to cut-off a connection state at a time of receipt of a prohibiting signal to prohibit the connection state from being released from the transfer control apparatus, and a cutting-off-allowing notifier for notifying of being allowed to cut-off the connection state at a time of receipt of an allowing signal to allow to release the connection state from the transfer control apparatus.

A fifth invention is a recording apparatus that records data and managing information of the data both transferred from a transfer control apparatus externally connected, comprising: a cutting-off-impossible notifier for notifying of being impossible to cut-off a connection state at a time of receipt of the data from the transfer control apparatus for a first time, and a cutting-off-allowing notifier for notifying of being allowed to cut-off the connection state at a time of receipt of an allowing signal to allow to release the connection state from the transfer control apparatus.

A sixth invention is a data transfer control method executed between a recording apparatus and a transfer control apparatus, which is connected to the recording apparatus in a manner capable of making a communication therebetween and, and transferring to the recording apparatus data and managing information of the data, wherein the transfer control apparatus executes following steps of: (a1) transmitting to the recording apparatus a prohibiting signal to prohibit a connection state from being released prior to a transfer of the data, and (b1) transmitting to the recording apparatus an allowing signal to allow to release the connection state when the transfer of the data is completed and a transfer of the managing information is also completed.

A seventh invention is a transfer control method executed between a recording apparatus, and a transfer control apparatus which is connected to the recording apparatus in a manner of capable of making a communication therebetween, and transferring to the recording apparatus data and managing information of the data, wherein the transfer control apparatus executes following steps of: (a1) transferring the data to the recording apparatus, and (b1) transmitting to the recording apparatus an allowing signal to allow to release the connection state when a transfer of the data is completed and a transfer of the managing information is also completed, and the recording apparatus executes following steps of: (a2) notifying of being impossible to cut-off the connection state at a time of receipt of the data for a first time, and (b2) notifying of being allowed to cut-off the connection state in response to the allowing signal.

The recording apparatus and the transfer control apparatus are connected in a manner of making a communication with each other by an interface such as a USB, an IEEE1394, and etc. or a LAN (including wire/wireless), and are capable of transferring from the transfer control apparatus to the recording apparatus data and managing information of the data such as an FAT, and etc. The transfer control apparatus transmits to the recording apparatus a prohibiting signal to prohibit releasing a state connected in a manner capable of making a communication (connection state) prior to the data transfer. In response thereto, the recording apparatus notifies a user of prohibiting releasing the connection state (impossible to cut-off). That is, it is notified of not being possible to disconnect a cable or to detach a card-type expansion device such as a PC card (LAN card). A cut-off-impossible-notifier turns-on a lamp, outputs a sound (including voice, music) or displays a text, for example so as to notify the cut-off-impossible state. When the data transfer is completed, and the transfer of the managing information is also completed, the transfer control apparatus transmits to the recording apparatus an allowing signal to allow to release the connection state. In receipt thereof, the recording apparatus notifies the user of allowing to release the connection state (allowed to cut-off). A cutting-off-allowing notifier turns-off the lamp, stops outputting the sound, and displays a text so as to notify that it is possible to cut-off the connection state, for example. This allows the user to recognize that the connection state is allowed to cut-off.

However, it is not needed the cutting-off-impossible signal is transferred from the transfer control apparatus, and when the recording apparatus receives the data from the transfer control apparatus for the first time, it may be informed that it is impossible to cut-off.

In the transfer control apparatus, for example, a timer starts counting a time at a time that a transfer of the data in a packet-by-packet manner is completed, and when the timer counts a predetermined time period, an updater updates the managing information, determining that the transfer of the data is completed. In addition, a writing instructor instructs the recording apparatus to write the managing information updated by the updater. That is, it is not that the managing information is updated in correspondence to the data transfer in the packet unit, but the managing information is updated at a time that all of the data transfers are completed, thus possible to eliminate a wasteful time.

Furthermore, in the transfer control apparatus, a command transmitter transmits to the recording apparatus a control command including at least an allowing signal or a prohibiting signal. It is noted that this control command may include a writing instruction signal for instructing to write data and a reading-out instruction signal for instructing to read-out the data. In the recording apparatus, a command receiver receives this control command, and a command determiner determines a content shown by the control command received by the command receiver, that is, an instruction content of the transfer control.

According to the present invention, since the user is notified of whether or not possible to release the connection state, there is no possibility that the connection state is released before the transfer of the data and the managing information thereof is completed. That is, it is possible to make a normal data transfer.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustrative view showing one embodiment of the present invention;

FIG. 2 is a block diagram showing structure of a PC shown in a FIG. 1 embodiment;

FIG. 5 is an illustrative view showing a format of a CBW;

FIG. 6 is an illustrative view showing a format of a CBWCB describing a command of being allowed to cut-off/impossible to cut-off a USB cable;

FIG. 14 is an illustrative view showing a format of a CSW; and

FIG. 15 is an illustrative view showing a data transfer from a PC to a camera in another embodiment of the present invention.

DETAILED DESCRIPTION OF THE PREFERRED EMBODIMENTS

Figure 3:
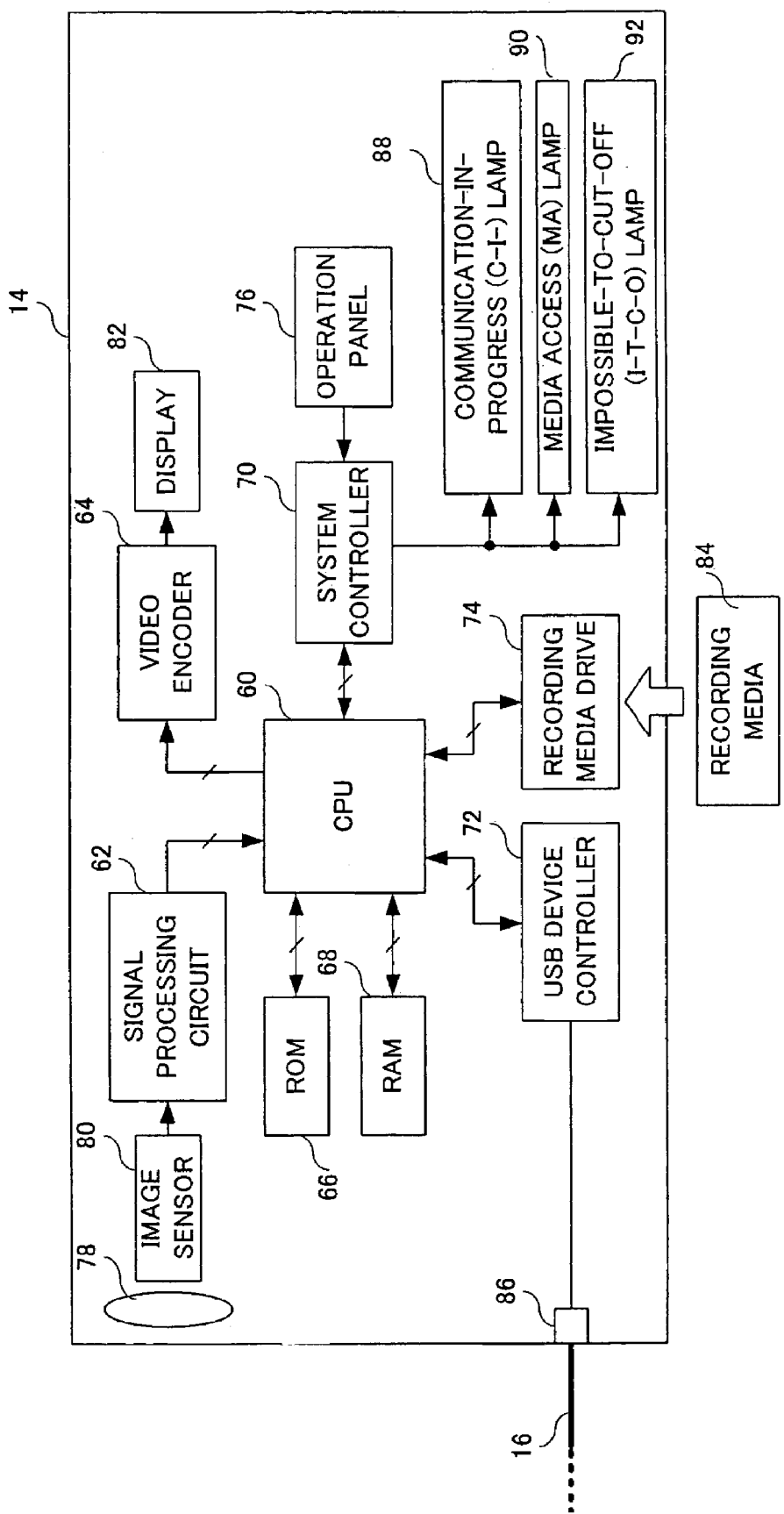
FIG. 3 is a block diagram showing structure of a camera shown in the FIG. 1 embodiment.

Referring to FIG. 1, a data transfer control system (hereinafter briefly referred to as "system") 10 of this embodiment includes a host computer (in this embodiment, PC) 12 as a transfer control apparatus and a digital camera (hereinafter briefly referred to as "camera") 14 as a recording apparatus. The PC 12 and the camera 14 are connected in a manner capable of making a communication therebetween by a USB cable 16.

As shown in FIG. 2, the PC 12 is a general-purpose computer, and includes a CPU 20. The CPU 20 is connected via an internal bus 22 to a video circuit 24, a ROM (BIOS) 26, a RAM 28, an IDE (Integrated Drive Electronics) control circuit 30, an FDD (Floppy (registered trademark) Disk Drive) control circuit 32, a USB host controller 34, and a keyboard/mouse input circuit 36.

In addition, an HDD (Hard Disk Drive) 38 is connected to the IDE control circuit 30, and an FDD 40 is connected to the FDD control circuit 32. Furthermore, a USB terminal 42 is connected to the USB host controller 34. The above-described USB cable 16 is connected to this USB terminal 42.

A display 44 such as a CRT or an LCD, a keyboard 46, and a computer mouse (mouse) 48 are connected to the PC 12. The display 44 is connected to the video circuit 24 via an interface (not shown). In addition, the keyboard 46 and the mouse 48 are connected to the CPU 20 via the interface (keyboard/mouse input circuit 36) and the internal bus 22.

Such the PC 12 is well known, so that detailed descriptions in each component will be omitted.

In addition, as shown in FIG. 3, the camera 14 includes a CPU 60, and the CPU 60 is connected via a bus to a signal processing circuit 62, a video encoder 64, a ROM 66, a RAM 68, a system controller 70, a USB device controller 72, and a recording media drive 74.

Programs for driving the camera 14, and executing various functions, and etc. are stored in the ROM 66, and the CPU 60 executes a process in response to instructions (input signals) input from an operation panel 76 via the system controller 70.

It is noted that although (not shown), a power switch, a shutter button, a cursor button, a reproduction button, a stop button, a mode change button, and etc. are provided on the operation panel 76.

An optical image of an object (object image) is radiated onto a light-receiving surface of an image sensor 80 such as a CCD imager, a CMOS imager, and etc. through a lens 78, for example. Once a power of the camera 14 is turned-on, the CPU 60 instructs a pre-exposure to a timing generator (TG) (not shown). The TG applies the pre-exposure in a predetermined time period to the image sensor 80, and reads-out a camera signal generated by the pre-exposure (raw image signal) from the image sensor 80 in accordance with a thinning-out system.

The read camera signal of a low resolution is subjected to a predetermined process in the signal processing circuit 62. More specifically, the camera signal is converted into a digital signal through a well-known noise removal and a well-known gain adjustment. YUV data is generated based on the camera signal converted into the digital signal, that is, camera data.

The CPU 60 outputs the generated YUV data to the video encoder 64. Then, the data is converted into a composite video signal in an NTSC standard, and the converted composite video signal is applied to a display 82 such as an LCD. As a result, a real time moving image of the object (through image) is displayed on a screen.

If the shutter button is operated, a signal of a photographing instruction is input into the CPU 60 via the system controller 70. In response thereto, the CPU 60 executes a main photographing process. More specifically, the TG is instructed to carry-out a main exposure of one frame and read-out all pixels. The TG, in response to the instruction from the CPU 60, executes the main exposure, and in addition, supplies timing signals to the image sensor 80 so as to output all electric charges accumulated by the main exposure. Accordingly, 1 a high resolution camera signal of one frame is output from the image sensor 80, and this camera signal is input into the signal processing circuit 62. Then, as a result of the process described above being applied thereto, the YUV data is generated.

Thereafter, the signal processing circuit 62, according to the instruction of the CPU 60, applies a JPEG compression to the YUV data generated as described above, and records the compressed YUV data into a recording media 84 such as a memory card attached to the media drive 74. It is noted that the recording media 84 may be incorporated within the camera 14 (storage device).

An image thus recorded in the recording media 84 (JPEG image file) is reproducible by a reproduction mode. More specifically, once entered the reproduction mode by operating the mode button, the CPU 60 instructs the recording media drive 74 to read-out the JPEG image file. The recording media drive 74, in response to this instruction, reads-out the JPEG image file from the recording media 84, and applies to the CPU 60. Then, the signal processing circuit 62, instructed by the CPU 60, expands the read JPEG image file, and returns it to the original YUV data. This YUV data is transferred to the video encoder 64 by the CPU 60, and converted into a composite video signal in accordance of the NTSC standard. The converted composite video signal is input into the display 82, thereby to display a reproduced image on a screen of the display 82.

It is noted that in the reproduction mode, it may be possible to display the reproduced image one by one, and in addition, display a plurality of the reproduced images in a multi-display manner. In what manner the reproduced image is displayed is selected by operating the mode button, and etc., and detailed descriptions are omitted.

Furthermore, the camera 14 is provided with a USB terminal 86. The USB terminal 86 is connected to the CPU 60 via the interface (USB device controller 72). The USB cable 16 as shown in FIG. 1 is connected to the USB terminal 86. This enables to access the recording media 84 attached to the camera 14 from the PC 12 side. That is, it is possible to transmit/receive data such as an image, an instruction, and etc.

That is, it is possible to transfer data (file) such as image data, sound data or text data, and etc. recorded in the PC 12 to the camera 14 (recording media 84), fetch data such as the image data recorded in the recording media 84 to the PC 12 side, and so on. During such the data transfer, a communication-in-progress lamp 88 for informing a user that the data is being transferred (being communicated) is blinked (flashed) by a control of the system controller 70. In addition, in a case of writing the data into the recording media 84, or reading-out the data from the recording media 84, a media access lamp 90 for notifying the user that a writing is under progress or a reading is under progress (being media-accessed) is flashed by the control of the system controller 70.

Thus, it is possible to notify or inform the user that the communication is being made, and the recording media 84 is being accessed. In a case of transferring the data from the PC 12 to the camera 14, once the data is fetched in the camera 14, the data is temporarily held in the RAM 68. Subsequently, instructed by the CPU 60, the data is recorded into the recording media 84 by the recording media drive 74.

When all the data transfers are ended, and thereafter, FAT data updated along the data transfer is written into the recording media 84 similar to the data. However, in a case of starting writing the FAT data after a considerable time period (10 seconds or so) has passed since the data transfer is ended, for example, it is probable that the user may determine that the data transfer is completely ended as a result of the communication lamp 88 and the media access lamp 90 being turned-off, and detach the USB cable 16. In this case, the data transfer is, in reality, incomplete, that is, the writing of the FAT data is not ended, thus resulting in a problem that it becomes not possible to reproduce the data, and etc., later.

In order to avert such the problem, in this embodiment, another lamp (cutting-off-impossible lamp) 92 is provided in addition to the communication lamp 88 and the media access lamp 90, and this lamp 92 is made blinked or turned-off so that the user is informed or notified that it is allowed to cut-off or impossible to cut-off of the USB cable.

Figure 4:
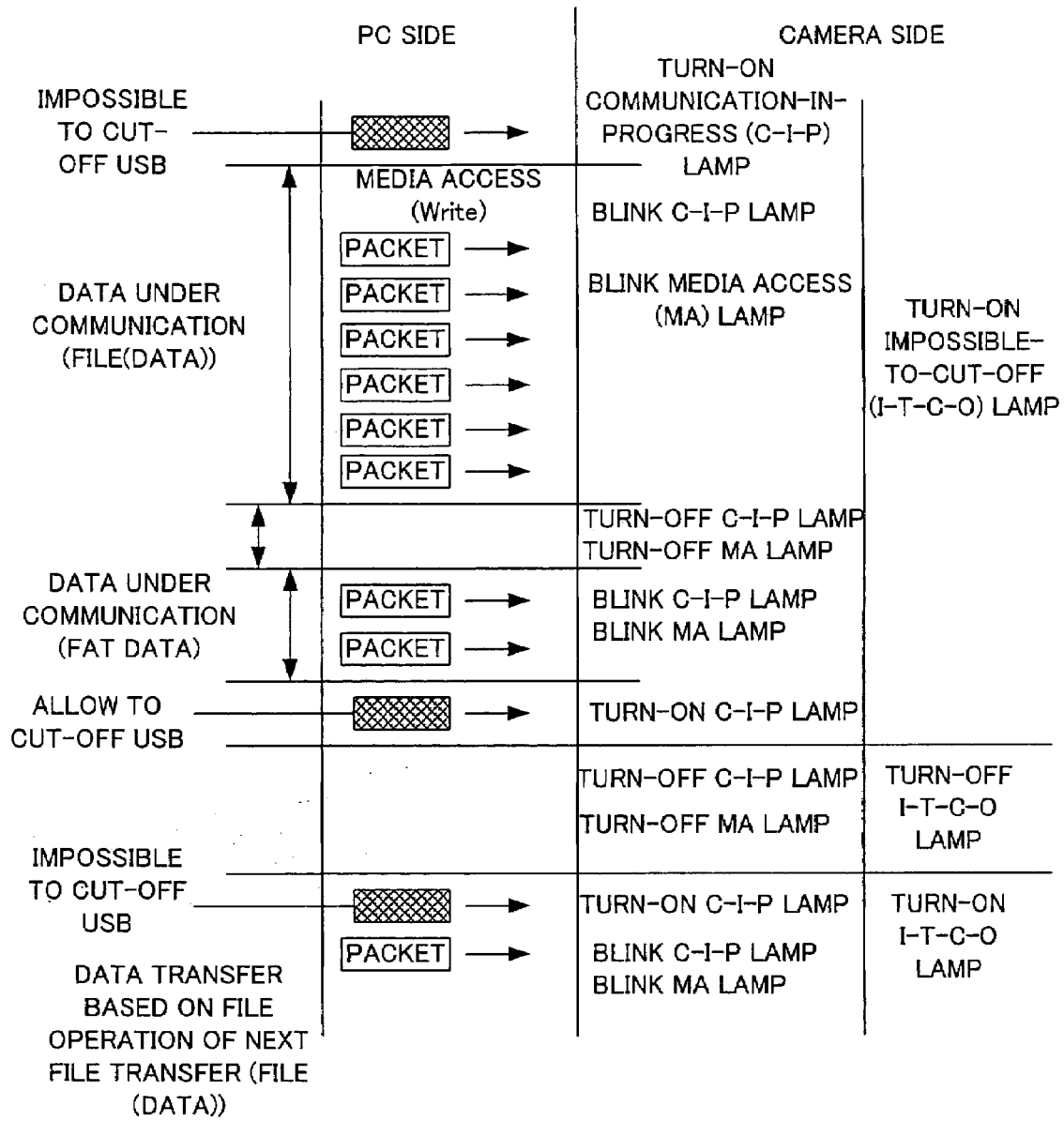
FIG. 4 is an illustrative view showing a data transfer from the PC to the camera shown in the FIG. 1 embodiment.

In a case of carrying-out the data transfer from the PC side as shown in FIG. 4, for example, the PC 12, prior to the data transmits, transfers to the camera 14 a command showing it is impossible to cut-off the USB cable 16. That is, being impossible to cut-off is requested. Then, the PC 12 starts the data transfer. That is, the transfer of the file (data) designated (instructed) by the user is started.

Herein, the command is included in a well-known CBW (Command Block Wrapper), and a format of this CBW is shown as in FIG. 5(A). Referring to FIG. 5(A), the CBW is constructed of 31 bytes×8 bits. In Byte 0-3, dCBWsignature (43425355h) is described, and this indicates an identifier of the CBW. Furthermore, in Byte 4-7, dCBWTag is described, and this indicates the tag number of the CBW. In addition, in BYTE 8-11, dCBWDataTransferLength is described, and this indicates the number of the bytes to be transferred.

Furthermore, in Byte 12, bmCBWFlag is described, and this indicates a data transfer direction. Specifically, the data transfer direction is determined by a value of Bit 7 forming this Byte 12. When Bit 7 is 0, the data transfer is from the camera 14 (device) to the PC 12 (host), and when Bit 7 is 1, the data transfer is from the PC 12 to the camera 14.

Furthermore, bCBWLUN is described in four bits of the last half (Bit 3-0) in Byte 13, and this indicates a logical unit number. It is noted that the four bits of the first half (Bit 7-4) are reserved bits (Reserved). In subsequent Byte 14, bCBWCBLength is described in five bits in the last half (Bit 4-0), and this indicates the number of the valid bytes of CBWCB, and three bits in the first half are reserved bits (Reserved).

Next, in Byte 15-30, CBWCB (Command Block of CBW) is described. This CBWCB is constructed as shown in FIG. 5(B). Specifically, Operation Code is described in Byte0 of CBWCB, and this is a kind of commands (kind of requests). In subsequent Byte 1-11, Operation Data based on the Operation Code is described. It is noted that remaining bytes (Byte 12-15) are not used.

Therefore, in a case of requesting from the PC 12 to the camera 14, CBW including CBWCB described according to the request is applied from the PC 12 to the camera 14. Herein, a data writing to the storage device (in this embodiment, camera 14) and a request regarding reading-out the data (CBWCB) are well-known, and therefore, an illustration and etc. in its details are omitted. In a case of requesting the above-described being allowed to cut-off/impossible to cut-off the USB cable, CBW including CBWCB as shown in FIG. 6 is applied from the PC 12 to the camera 14.

Referring to FIG. 6, in CBWCB including the command of being allowed to cut-off/impossible to cut-off, "F8h" is described in Byte0 as the Operation Code, and this indicates being allowed to cut-off/impossible to cut-off the USB cable. In subsequent Byte 1-Byte 11, Operation Data based on the Operation Code is described as described above. In this embodiment, for example, Bit 0 of Byte 2 is used as an allow Bit, and in a case that the allow Bit is 0, this indicates that it is impossible to cut-off the USB cable, and in contrary, in a case of 1, this indicates that it is allowed to cut-off.

On the contrary, in receipt of the command showing that it is impossible to cut-off the USB cable, the camera 14 turns-on the cut-off-impossible-lamp 92, and subsequently, turns-on the communication-in-progress lamp 88. Furthermore, the camera 14 blinks the communication-in-progress lamp 88 and blinks the media access lamp 90 during when the data is being received.

Returning to FIG. 4, since the data is transmitted in a packet by packet manner, when a packet is being actually transferred, the communication-in-progress lamp 88 is turned-on, and the communication lamp 88 is turned-off during a period from a previous packet transfer is ended to a next packet transfer is started. Such the operation is repeated when the data transfer is under progress thus the communication-in-progress lamp 88 is turned-on/off (blinked).

In addition, the transferred data is temporarily held in the RAM 68, and the data is written into the recording media 84 by each predetermined amount. Therefore, during a period that the data is being written, the media access lamp 90 is turned-on when the data is actually being written, and the media access lamp 90 is turned-off when the data writing is being suspended. This causes the media access lamp 90 to blink.

Next, when the data (file) transfer is ended, the communication-in-progress lamp 88 and the media access lamp 90 are temporarily turned-off. It is noted that in order to avert the problem described above, the cut-off-impossible lamp 92 maintains a state of being turned-on.

Thereafter, the PC 12 starts transferring the FAT data updated along the file transfer. When the FAT data transfer starts, the camera 14 blinks the communication-in-progress lamp 88 and the media access lamp 90 once again. Upon completion of transferring and recording the FAT data, the PC 12 transmits to the camera the command showing that it is impossible to cut-off the USB cable 16.

At this time, the camera 14 turns-on the communication-in-progress lamp 88 and after receiving the command showing not possible to cut-off, turns-off the communication-in-progress lamp 88, the media access lamp 90, and the cut-off-impossible lamp 92.

Figure 7:
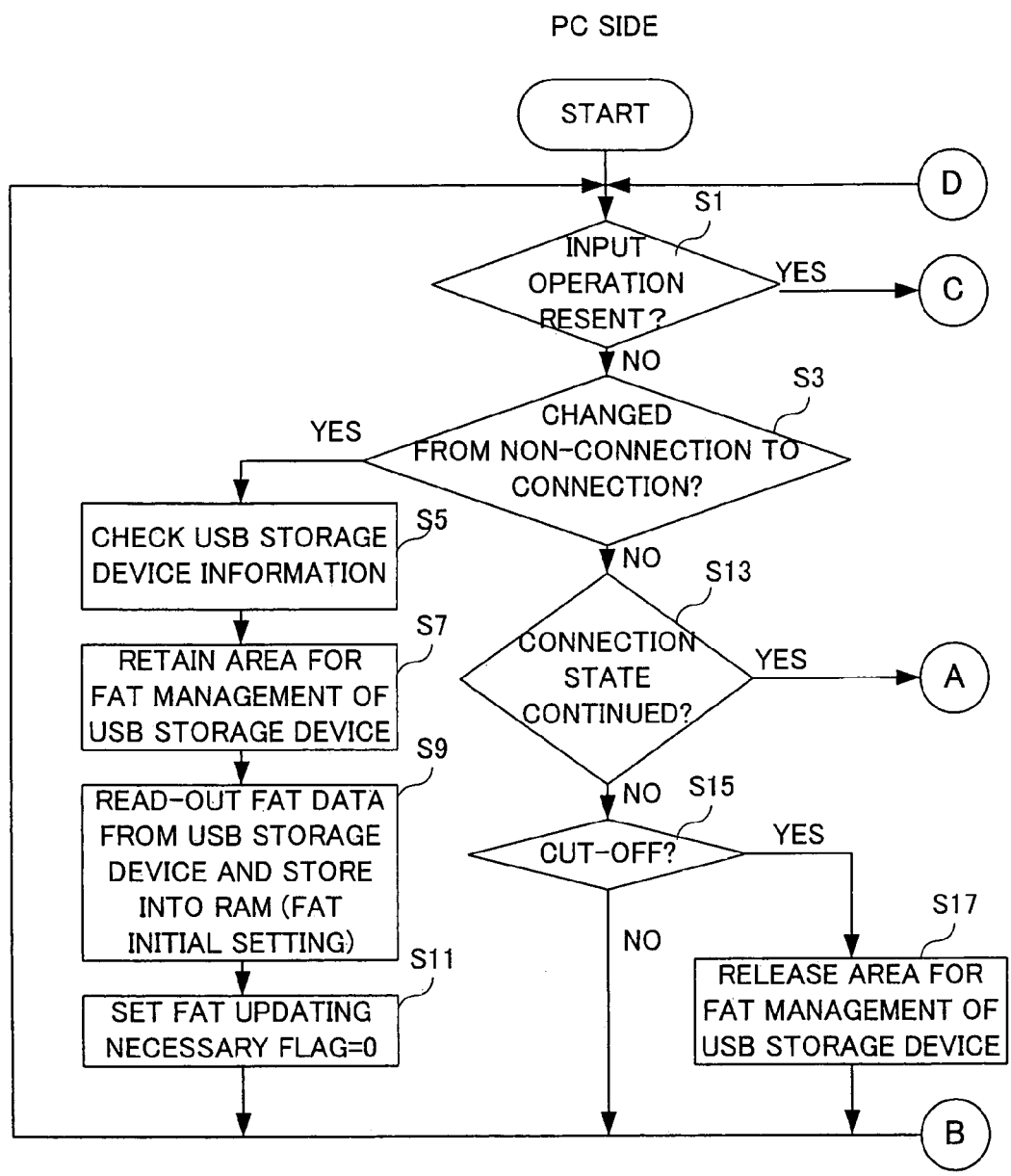
FIG. 7 is a flowchart showing a portion of a process of a CPU provided in the PC shown in the FIG. 1 embodiment.

More specifically, the CPU 20 of the PC 12 and the CPU 60 of the camera 14 execute processes described below. As shown in FIG. 7, when a main power of the PC 12 is turned-on, the CPU 20 starts a process, and determines whether or not there is an input operation in a step S1. That is, it is determined whether or not the user inputs an instruction using the keyboard 46 or mouse 48.

Figure 9:
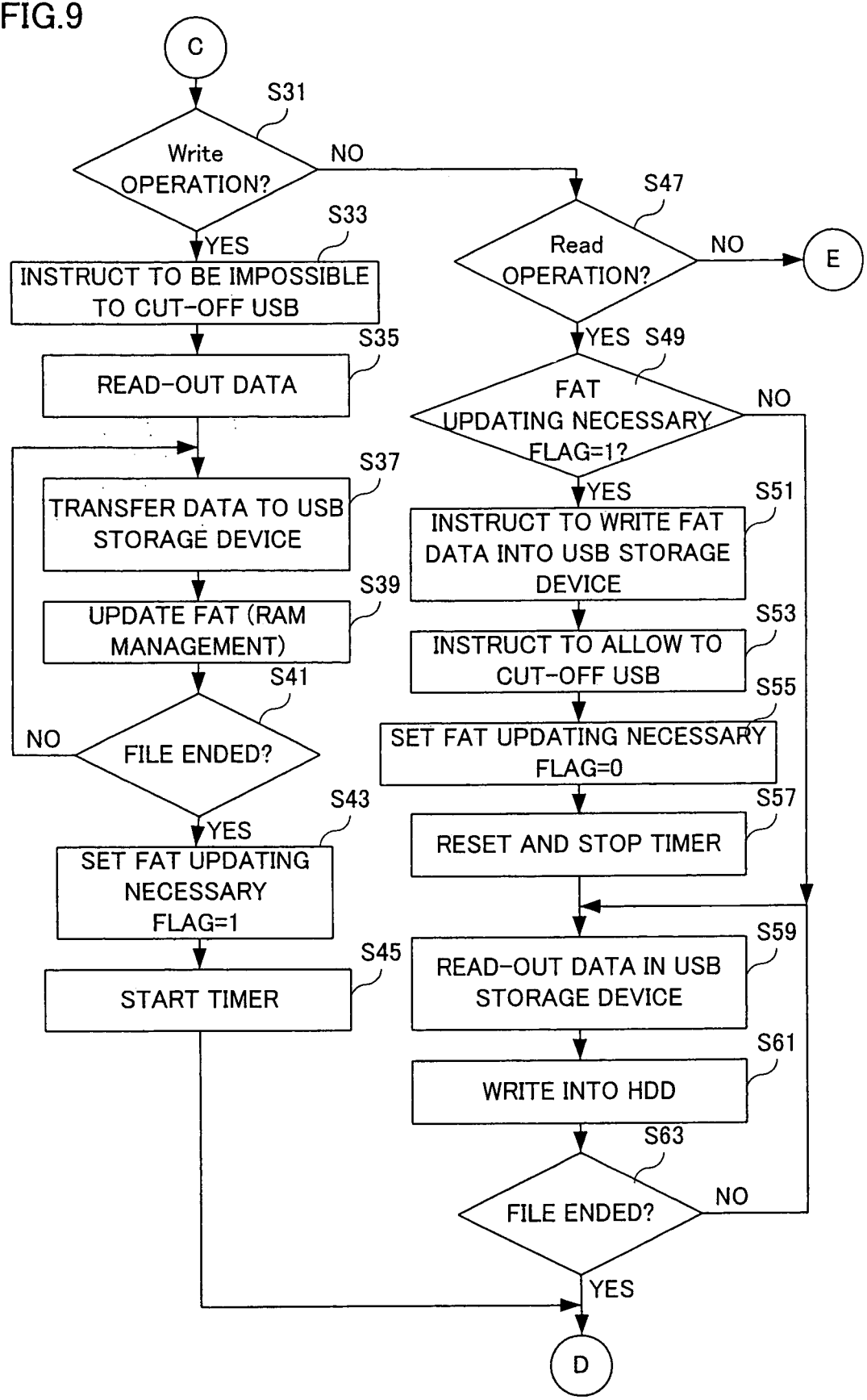
FIG. 9 is a flowchart showing further portion of the process of the CPU provided in the PC shown in the FIG. 1 embodiment.

If "YES" in the step S1, that is, if the input instruction is found, the process advances to a step S31 shown in FIG. 9, determining that the instruction from the user is found. On the other hand, if "NO" in the step S1, that is, if there is no input instruction, it is determined whether or not the USB cable 16 is connected (attached) in a step S3, determining that there is no instruction from the user. That is, it is determined whether or not the USB cable 16 is physically changed from a non-connection state to the connection state.

If "YES" in the step S3, that is, if the USB cable 16 is attached, a connection sequence to the USB storage device (in this embodiment, camera 14) is started, and device information of the camera 14 (product name of the camera 14, and etc.) is checked in a step S5. In a succeeding step S7, an area used for an FAT management of the camera 14 is retained within the RAM 28.

Next, in a step S9, the FAT data is read-out from the camera 14, and the FAT data is stored in the area retained in the step S7. That is, the FAT data is initialized. Then, in a step S11, an FAT updating necessary flag is set to 0 before returning to the step S11.

Furthermore, if "NO" in the step S3, that is, if the USB cable 16 is not attached, it is determined whether or not the connection state of the USB cable 16 is still continued in the step S13. If "YES" in the step S13, that is, if the connection state of the USB cable 16 is still continued, the process advances to a step S19 shown in FIG. 8.

On the other hand, if "NO" in the step S13, that is, if the connection state of the cable 16 is not continued, it is determined whether or not the USB cable 16 is cut-off in the step S15. That is, it is determined whether or not the USB cable 16 is detached, and the connection state is physically released.

If "NO" in a step S15, that is, if the USB cable 16 is not cut-off, the process directly returns to the step S1, determining that the input instruction and the USB cable 16 are not detached. On the other hand, if "YES" in the step S15, that is, if the USB cable 16 is cut-off, the process releases the area for the FAT management of the camera 14 provided in the RAM 28 in a step S17 before returning to the step S1.

Figure 8:
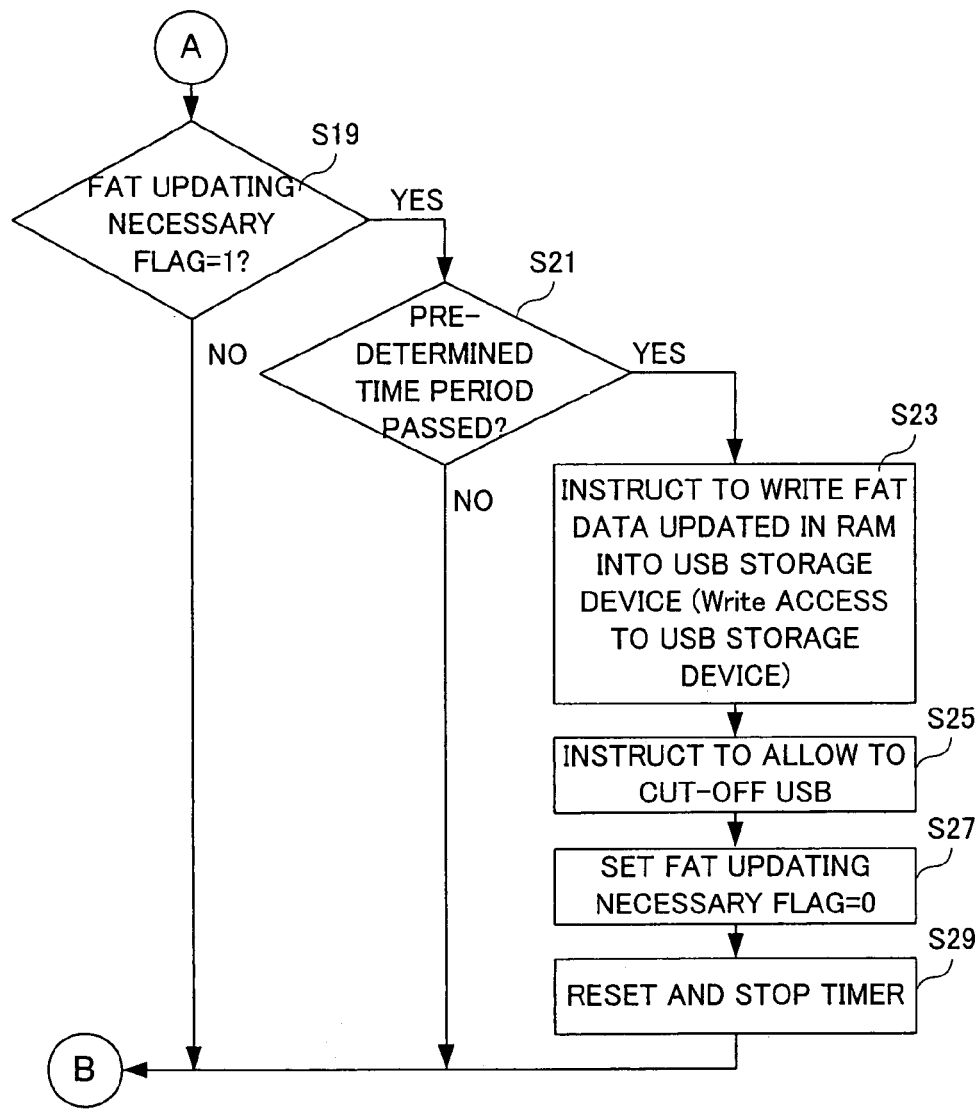
FIG. 8 is a flowchart showing another portion of the process of the CPU provided in the PC shown in the FIG. 1 embodiment.

As shown in FIG. 8, in a step S19, it is determined whether or not the FAT updating necessary flag is 1. If "NO" in the step S19, that is, if the FAT updating necessary flag is 0, the process directly returns to the step S1, determining that it is not necessary to update the FAT data.

On the other hand, if "YES" in the step S19, that is, if the FAT updating necessary flag is 1, it is determined whether or not a predetermined time period has passed in a step S21, determining that it is necessary to update the FAT data.

Herein, in this embodiment, the data is transmitted in the packet unit as described above, and in a case of transferring a plurality of data, the predetermined time period is counted so as to determine whether or not all the data are transferred. That is, this is due to a reason that an updating of the FAT data is carried-out in a cache memory (not shown) within the RAM 20 until the transfer of all data is ended (data transfer is completed), and the FAT data stored in the RAM 28 is updated upon completion of the data transfer, thereby becoming possible to execute the data transfer in a shorter time period than updating the FAT data within the RAM 28 at every time that the packet transfer is ended, for example.

It is noted that although not illustrated, the predetermined time period is counted by a timer provided within the CPU 20, and the timer, as described later, starts counting when the FAT updating necessary flag is set to 1 in a case of the data transfer to the storage device, that is, the camera 14 (see FIG. 9).

If "NO" in the step S21, that is, if the predetermined time period has not passed, the process directly returns to the step S1. On the other hand, if "YES" in the step S21, that is, if the predetermined time period has passed, the process updates the FAT data stored in the area for the FAT management using the FAT data in the cache memory in a step S23, and instructs the camera 14 to write the updated FAT data. At this time, the USB host controller 34, according to an instruction of the CPU 20, transmits the FAT data recorded in the RAM 28 to the camera 14.

Subsequently, in a step S25, a command instructing that it is allowed to cut-off the USB cable 16 is applied to the camera 14, and in a step S27, the FAT updating necessary flag is set to 0. Then, in a step S29, the timer is reset or suspended before returning to the step S1.

As described above, if "YES" in the step S1 in FIG. 7, it is determined whether or not the data transfer, that is, an instruction to write the data (Write operation) is found in a step S31 as shown in FIG. 9. If "NO" in the step S31, that is, if it is not the Write operation, the process advances to a step S47. On the other hand, if "YES" in the step S31, that is, if it is the Write operation, being impossible to cut-off the USB is instructed to the camera 14 in a step S33. That is, prior to the data transfer, being impossible to cut-off the USB is instructed.

In a succeeding step S35, the file (data) instructed to be transferred is found is read-out from the HDD 38, and the data is transferred to the camera 14 in a step S37. That is, CBW including the Write command is transmitted to the camera 14. Next, in a step S39, the FAT data stored in the area for the FAT management of the RAM 28 is updated, and it is determined whether or not to end the file in a step S41. That is, it is determined whether or not all the instructed data are transferred.

If "NO" in the step S41, that is, unless the transfer of all data is ended, the process directly returns to the step S37 so as to continue transferring the file. On the other hand, if "YES" in the step S41, that is, the transfer of all data is ended, the FAT updating necessary flag is set to 1 in a step S43, and the timer is started in a step S45 before returning to the step S1.

In a step S47, it is determined whether or not an instruction to read-out the data (Read operation) is found. If "NO" in the step S47, that is, if the Read operation is not found, the process advances to a step S65 shown in FIG. 10. On the other hand, if "YES" in the step S47, that is, if Read operation is found, it is determined whether or not the FAT updating necessary flag is 1 in a step S49.

If "NO" in the step S49, that is, if the FAT updating necessary flag is 0, the process directly advances to a step S59. However, if "YES", that is, if the FAT updating necessary flag is 1, the camera 14 is instructed to write the FAT data in a step S51. In a succeeding step S53, being allowed to cut-off the USB cable 16 is instructed to the camera 14, and in a step S55, the FAT updating necessary flag is set to 0. Next, in a step S57, the timer is reset and stopped, and then, the process advances to a step S59.

In the step S59, the file recorded in the recording media of the camera 14 is read-out, and in a step S61, the read file is written into the HDD 38. It is noted that the file may be temporarily stored in the RAM 28, and then, written into the HDD 38.

Then, in a step S63, it is determined whether or not to end the file. That is, it is determined whether or not it is ended to read-out all the instructed data. If "NO" in the step S63, that is, unless it is not to end reading-out all the data, the process directly returns to the step S59 so as to continue reading-out the file. On the other hand, if "YES" in the step S63, that is, if it is to end reading-out all the data, the process returns to the step S1 shown in FIG. 1.

Figure 10:
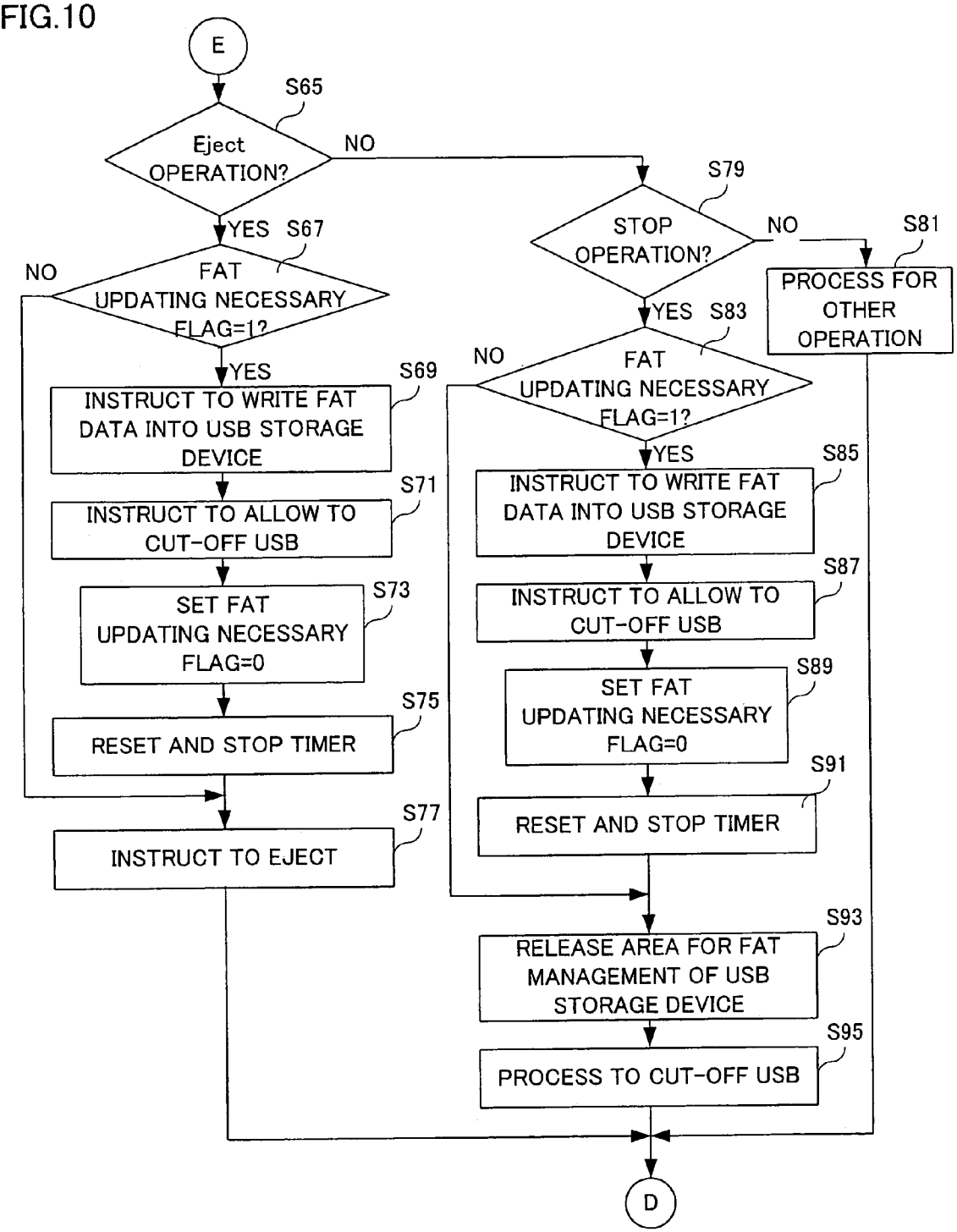
FIG. 10 is a flowchart showing the other portion of the process of the CPU provided in the PC shown in the FIG. 1 embodiment.

As shown in FIG. 10, in a step S65, it is determined whether or not an instruction to eject the recording media 84 (Eject operation) is found. If "NO" in the step S65, that is, if the Eject operation is not found, the process advances to a step S79. On the other hand, if "YES" in the step S65, that is, if the Eject operation is found, it is determined whether or not the FAT updating necessary flag is 1 in a step S67.

If "NO" in the step S67, that is, the FAT updating necessary flag is 0, the process directly returns to a step S77. On the other hand, if "YES" in the step S67, that is, if the FAT updating necessary flag is 1, the camera 14 is instructed to write the FAT data in a step S69, and being allowed to cut-off the USB cable 16 is instructed to the camera 14 in a step S71. Subsequently, in a step S73, the FAT updating necessary flag is set to 0, and in a step S75, the timer is reset and stopped. Next, the camera 14 is instructed to eject in the step S77, and then, the process returns to the step S1 shown in FIG. 7.

In the step S79, it is determined whether or not a stop instruction (stop operation) is found. If "NO" in the step S79, that is, if the stop operation is not found, either, the process executes the process in accordance with the operation in a step S81 before returning to the step S1, determining that another application, and etc. are operated. On the other hand, if "YES" in the step S79, that is, if the stop operation is found, it is determined whether or not the FAT updating necessary flag is 1 in a step S83.

If "NO" in the step S83, that is, if the FAT updating necessary flag is 0, the process directly advances to a step S93. On the other hand, if "YES" in the step S83, that is, if the FAT updating necessary flag is 1, the camera 14 is instructed to write the FAT data in a step S85, and being allowed to cut-off the USB cable 16 is instructed to the camera 14 in a step S87. Subsequently, the FAT updating necessary flag is set to 0 in a step S89, and the timer is reset and stopped in a step S91.

In a step S93, the area for the FAT managing regarding the camera 14 provided in the RAM 28 is released, and in a step S95, a cutting-off process of the USB cable 16 is executed before returning to the step S1. However, the USB cable 16 is not cut-off mechanically but electronically in the step S95.

Figure 11:
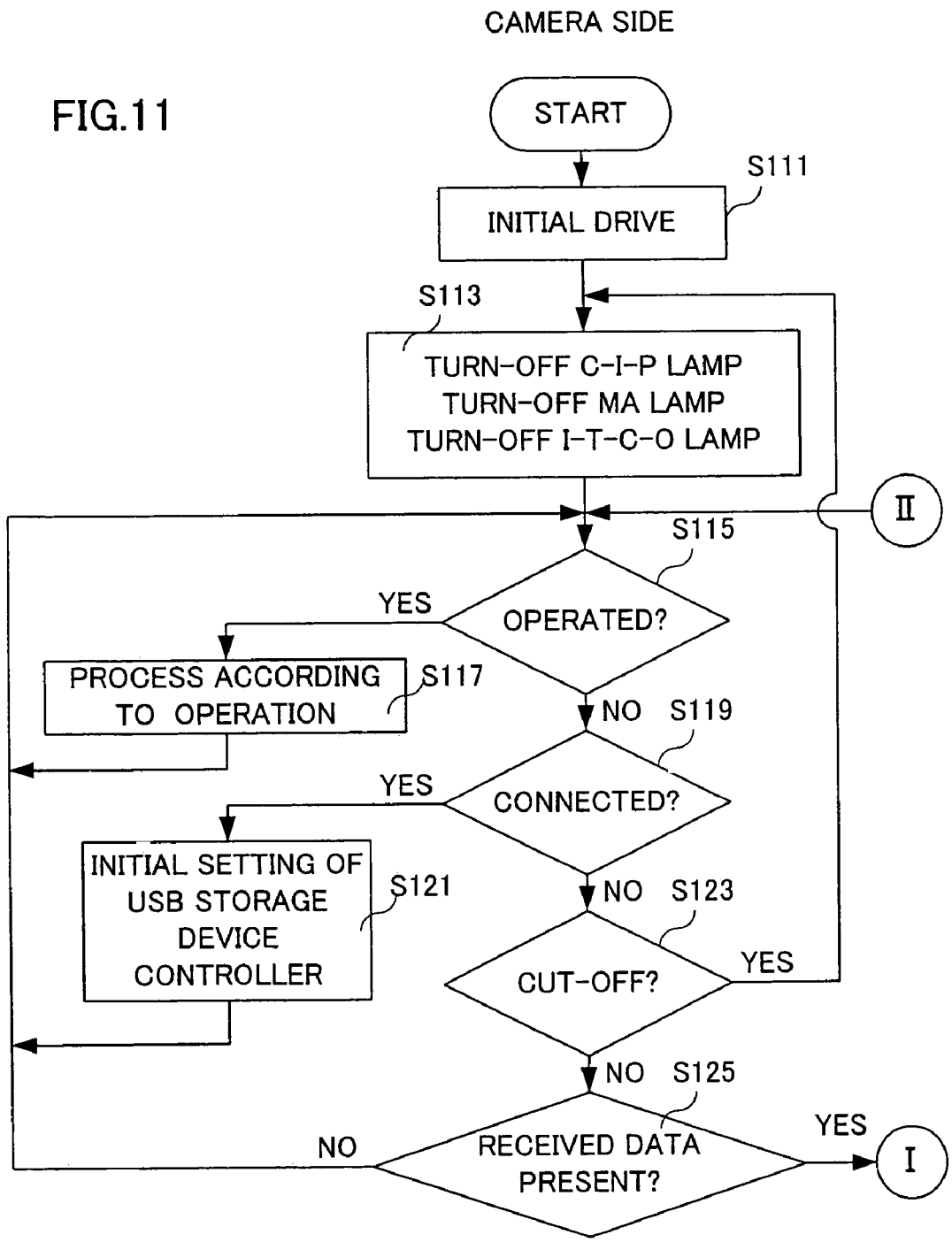
FIG. 11 is a flowchart showing a portion of the process of the CPU provided in the PC shown in the FIG. 1 embodiment.

On the other hand, the CPU 60 of the camera 14 starts a process when a main power of the camera 14 is turned-on as shown in FIG. 11, and is initially driven in a step S111. A state of the camera 14, e.g. whether or not the recording media 84 is attached, a remaining amount in a case that the recording media 84 is attached, or whether or not the mode such as a photographing mode, a reproduction mode, and etc. is set, for example, is recognized.

In a succeeding step S113, the communication-in-progress lamp 88, the media access lamp 90, and the cutting-off-impossible lamp 92 are turned-off. Then, in a step S115, it is determined whether or not an instruction (operation) by the user is found. If "YES" in the step S115, that is, if the user has operated, the process executes the process corresponding to the operation in a step S117 before returning to the step S1. The process regarding the camera 14, that is, the camera itself (photographing process, reproduction process, and etc.) is executed in a step S117, for example.

On the other hand, if "NO" in the step S115, that is, if the user did not operate, it is determined whether or not the USB cable 16 is connected in a step S119. That is, it is determined whether or not the USB cable 16 changed from the non-connection state to the connection state. If "YES" in the step S119, that is, if the USB cable 16 is connected, an initializing process of a USB storage device controller (USB device controller 72) is made in a step S121 before returning to the step S115.

On the other hand, if "NO" in the step S119, that is, if the USB cable 16 is not connected, it is determined whether or not the USB cable 16 is cut-off in a step S123. That is, it is determined whether or not the USB cable 16 changed mechanically from the connection state to the non-connection state. If "YES" in the step S123, that is, if the USB cable 16 is cut-off, the process directly returns to the step S113. However, if "NO" in the step S123, that is, if the USB cable is not cut-off, it is determined whether or not the received data is found in a step S125.

Figure 12:
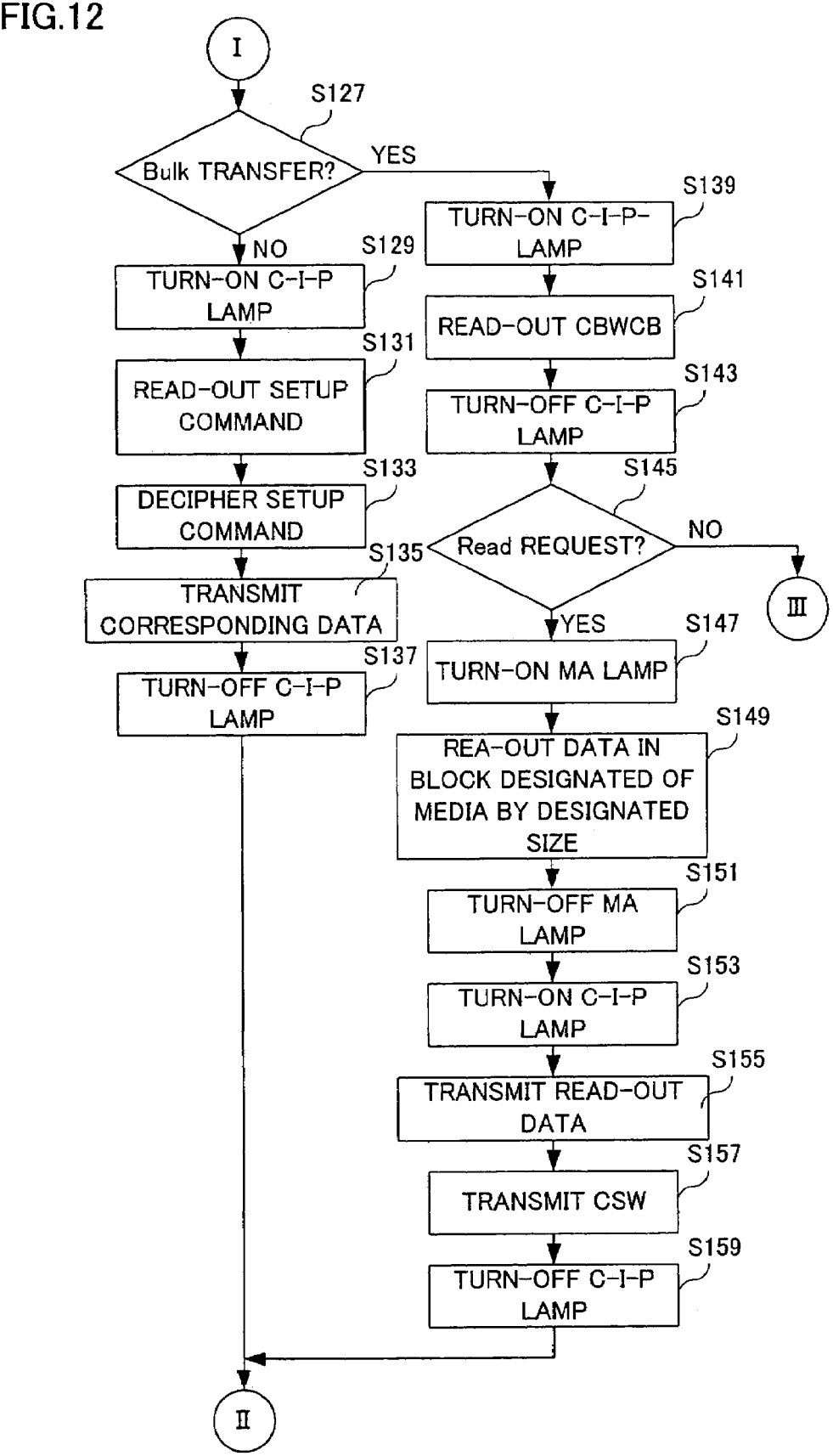
FIG. 12 is a flowchart showing another portion of the process of the CPU provided in the PC shown in the FIG. 1 embodiment.

If "NO" in the step S125, that is, if the received data is not found, the process directly returns to the step S115. However, if "YES", that is, if the received data is found, the process advances to a step S127 shown in FIG. 12. In the step S127, it is determined whether or not it is a Bulk transfer. If "YES" in the step S127, that is, if it is the Bulk transfer, the process advances to a step S139.

On the other hand, if "NO" in the step S127, that is, if it is not the Bulk transfer but a control transfer, the communication-in-progress lamp 88 is turned-on in a step S129. It is noted that at this time, the CPU 60 only instructs the system controller 70 to turn-on the communication-in-progress lamp 88, and it is by the control of the system control 70 that the communication-in-progress lamp 88 is turned-on. That is, the communication-in-progress lamp 88 is turned-on/turned-off (including blinked) by the control of the system controller 70 under the instruction of the CPU 60. The same is true of another lamp 90, and 92. The same is also applied in the embodiment described below.

Subsequently, in a step S131, a SETUP command is read-out, and next, in a step S133, the SETUP command is deciphered. Then, in a step S135, the data corresponding to the STEP command is transmitted to the PC 12, and the process turns-off the communication-in-progress lamp 88 in a step S137 before returning to the step S115. It is noted that the data-corresponding to the SETUP command refers to unique data (information) for a USB device, and an example includes the product number, and etc.

In a step S139, the communication-progress-lamp 88 is turned-on, and subsequently, in a step S141, the read data, that is, the command (CBWCB) included in CBW is read-out. Then, in a step S143, the communication-in-progress lamp 88 is turned-off. In a succeeding step S145, it is determined whether or not an operation command shown by CBWCB is a reading-out (Read) request.

Figure 13:
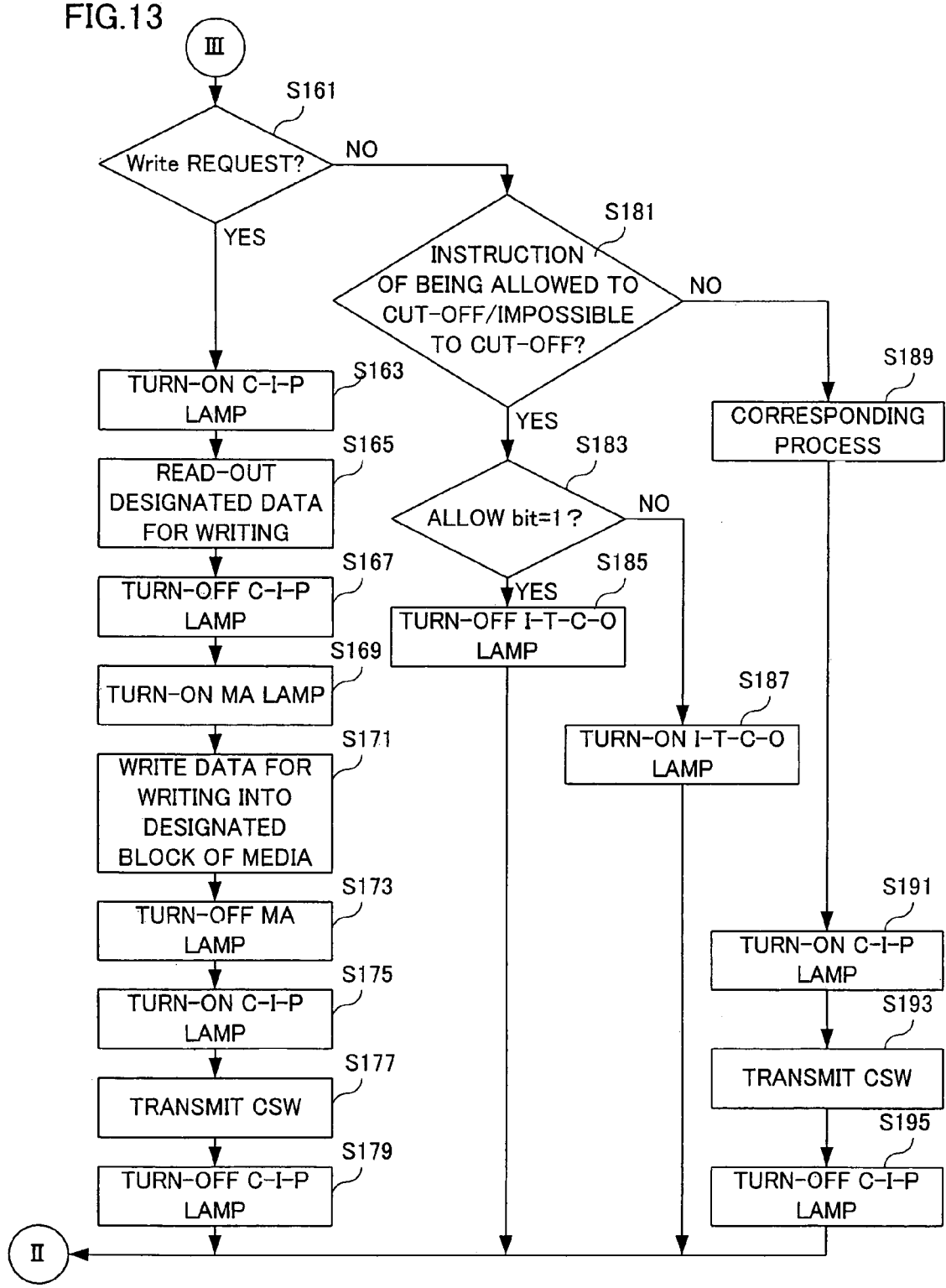
FIG. 13 is a flowchart showing the other portion of the process of the CPU provided in the PC shown in the FIG. 1 embodiment.

If "NO" in the step S145, that is, if the Read request is not found, the process advances to a step S161 shown in FIG. 13. On the other hand, if "YES" in the step S145, that is, if the Read request is found, the media access lamp 90 is turned-on in a step S147. Next, data in a designated block of the recording media 84 is read-out by a designated size in a step S149, and the media access lamp 90 is turned-off in a step S151.

Then, the communication-in-progress lamp 88 is turned-on in a step S153, the read data in the step S149 is transmitted to the PC 12 in a step S155. Next, in a step S157, CSW (Command Status Wrapper) in a format as shown in FIG. 14(A) is transmitted, and the communication-in-progress lamp 88 is turned-off in a step S159 before returning to the step S115.

Herein, CSW is structured of 12 bytes×8 bits as shown in FIG. 14(A). In Byte 0-3, dCSWsignature (53425355h) is described, and this indicates an identifier of CSW. In a next Byte 4-7, dCSWTag is described, and this indicates the tag number of CSW (copy of CBW). Subsequently, in Byte 8-11, dCSWDataResidue is described, and this indicates the number of Byte to be processed. That is, it indicates a data amount to be written or to be read. Then, in Byte 12, CSWStatus as shown in FIG. 14(B) is describedf.

More specifically, if a value of CSWStatus is "00h", it means Command Passed (good status), that is, it is normally operated. In addition, if the value of CSWStatus is "01h", this means Command Failed, that is, it failed to respond to a request of the PC 12. Furthermore, if the value of CSWStatus is "02h", it means Phase Error. In addition, the values of CSWStatus, "03h" or "04h", and "05h"-"FFh", are used as extra.

As a result of such CSW being transmitted to the PC 12, the PC 12 can recognize a state of the camera 14. The same is true of the embodiment described below.

As shown in FIG. 13, in a step S161, it is determined whether or not a writing (Write) request is found. If "NO" in the step S161, that is, if the Write request is not found, the process advances to a step S181. On the other hand, if "YES"

in the step S161, that is, if the Write request is found, the communication-in-progress lamp 88 is turned-on in a step S163.

In a succeeding step S165, instructed (designated) writing-use data is read-out from the PC 12, and the communication-in-progress lamp 88 is turned-off in a step S167. It is noted that the read data is temporarily held in the RAM 68. Next, the media access lamp 90 is turned-on in a step SI 69, and the writing-use data, that is, the data held in the RAM 68, is written into the designated block of the recording media 84 in a step S171, and the media access lamp 90 is turned-off in a step S173.

Next, the communication-in-progress lamp 88 is turned-on in a step S175, CSW is transmitted in a step S177, and thereafter, the process turns-off the communication-in-progress lamp 88 before returning to the step S115.

In a step S181, it is determined whether or not being allowed to cut-off/impossible to cut-off is found. If "NO" in the step S181, that is, if being allowed to cut-off/impossible to cut-off is not found, either, the process advances to a step S189. On the other hand, if "YES" in the step S181, that is, if being allowed to cut-off/impossible to cut-off is found, it is determined whether or not an allow Bit is 1 in a step S183. That is, whether being allowed to cut-off/impossible to cut-off is determined.

If "YES" in the step S183, that is, if the allow Bit is 1, being allowed to cut-off is determined, and the cutting-off-impossible-lamp 92 is turned-off in a step S185 before returning to the step S115. On the other hand, if "NO" in the step S183, that is, if the allow Bit is 0, being impossible to cut-off is determined, and the cutting-off-impossible lamp 92 is turned-off before returning to the step S115.

In a step S189, the process corresponding to the instructions other than those described above, that is, processes such as an ejecting process of the recording media 84, and etc. are executed. Thereafter, the communication-in-progress lamp 88 is turned-on in a step S191, and CSW is transmitted in a step S193. Then, the communication-in-progress lamp 88 is turned-off in a step S195 before returning to the step S115.

According to this embodiment, the USB cutting-off-impossible lamp remains turned-on until the transfer of the data and the FAT data corresponding thereto is completed so that it is possible to prevent the USB cable from being cut-off when the data transfer is under progress. That is, it is possible to surely execute the data transfer.

It is noted that in this embodiment, the cutting-off-impossible lamp 92 is provided, and as a result of this lamp being turned-on/off, the user is notified that it is allowed to cut-off/impossible to cut-off. However, it may be possible to notified by a sound (including voices, and music), display a message on a display, and etc., for example.

In addition, in this embodiment, the PC 12 and the camera 14 are connected using the USB cable. However, this may be applied to a case that these are connected by an IEEE1394, a LAN, or a wireless LAN. Therefore, in a case of notifying that it is impossible to cut-off, it not only prohibits the cable from being detached, but it also prohibits a card-type expansion device such as a PC card (LAN card) from being detached. Furthermore, in a case of a so-called laptop computer, pulling off both the cable and the PC card is prohibited.

Furthermore, in this embodiment, the electronic camera is shown as the storage device (camera 14). However, this is not always the case, and it is needless to say that it is applicable to another storage device such as a CD drive, a DVD drive, an FDD, a HDD, or a small-type external recording device (SD16U, SD32U manufactured by OMRON Corporation, for example), which is independently provided of the transfer control device (PC 12), and connected in a manner capable of making a communication with the transfer control device.

A system 10 according to another embodiment is the same as in the above-described embodiment except that it is by the camera 14 that notifies that it is impossible to cut-off in a case of the data transfer other than the instruction of being allowed to cut-off from the PC 12, thus duplicated descriptions will be omitted. In the system 10 in the other embodiment, as shown in FIG. 15, when the data transfer other than the instruction of being allowed to cut-off from the PC 12 starts, the camera 14 turns-on the USB cutting-off-impossible lamp 92. In addition, when the data transfer is under progress, similar to the above-described embodiment, the communication-in-progress lamp 88 is blinked, and the media access lamp 90 is also blinked.

Upon completion of transferring the data, the media access lamp 90 is turned-off, and thereafter, the PC 12 applies a writing request of the FAT data to the camera 14. At this time, the communication-in-progress lamp 88 and the media access lamp 90 are blinked. However, the camera 14 is not instructed that it is allowed to cut-off, and therefore, the cut-off-impossible lamp 92 maintains a state of being turned-on.

Upon completion of writing the FAT data, the PC 12 applies to the camera 14 an instruction of being allowed to cut-off, and in response thereto, the camera 14 turns-off the communication-in-progress lamp 88, the media access lamp 90, and the cut-off-impossible lamp 92.

Thus, the user is informed that it is impossible to cut-off the USB cable 16, and the CPU 20 of the PC 12 and the CPU 60 of the camera 14 execute the process similar to that described using the flowchart in the above-described embodiment. Therefore, only different points are described, and descriptions of duplicated portions will be omitted.

As described above, in a case of determining that it is the data transfer other than the instruction of being allowed to cut-off, the camera 14 turns-on the cutting-off-impossible lamp 92, and therefore, in the process of the CPU 20 of the PC 12, it is not needed to instruct the camera 14 that it is impossible to cut-off. This eliminates the process to instruct that it is impossible to cut-off in the step S33 shown in FIG. 9. It is noted that the other processes are the same as those shown in FIG. 7-FIG. 10.

On the other hand, in the process of the CPU 60 of the camera 14, in the step S161 in FIG. 13, after "YES" is determined, before turning-on the communication-in-progress lamp 88 in the step S163, a process of turning-on the cutting-off-impossible lamp 92 is inserted. In addition, in the step S183 in same FIG. 13, in a case of determining "NO", the process may be directly returned to the step S115. That is, a turning-on process of the cutting-off-impossible lamp 92 is eliminated in the step S187. It is noted that other processes are the same as those shown in FIG. 11-FIG. 13.

According to another embodiment, in a case of the data transfer other than the instruction of being allowed to cut-off, the user is notified that it is impossible to cut-off, and thus, the same advantage as that described in the above embodiment is obtained even if the instruction of being impossible to cut-off is not applied from a PC side.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer control system provided with a recording apparatus, and a transfer control apparatus connected to said recording apparatus in a manner capable of making a communication there between and transferring to said recording apparatus data and managing information of said data, said transfer control apparatus comprising:
- a prohibiting signal transmitter for transmitting, prior to a transfer of said data, to said recording apparatus a prohibiting signal to prohibit a connection state from being released;
- an allowing signal transmitter for transmitting to said recording apparatus an allowing signal to allow to release said connection state when the transfer of said data is completed, and a transfer of said managing information is also completed;
- a timer for starting a count of a predetermined time period at a time that the transfer of said data is ended;
- an updater for updating said managing information, determining that the transfer of said data is completed when said timer counts said predetermined time period; and
- a writing instructor for instructing said recording apparatus to write the managing information updated by said updater, and said recording apparatus comprising:
- a cutting-off-impossible notifier for notifying of being impossible to cut-off in response to a reception of said prohibiting signal; and
- a cutting-off-allowing notifier for notifying of being allowed to cut-off in response to a reception of said allowing signal.

2. A data transfer control system according to claim 1, wherein
said transfer control apparatus further comprising a command transmitter for transmitting to said recording apparatus a control command including at least said allowing signal or said prohibiting signal, and
said recording apparatus further comprises a command receiver for receiving said control command, and a command determiner for determining a content shown by the control command received by said command receiver.

3. A data transfer control system according to claim 1, wherein
said transfer control apparatus and said recording apparatus are wire-connected or wireless-connected,
said cutting-off-impossible notifier notifies of being impossible to detach a cable or a card-type expansion device attached to at least one of said transfer control apparatus and said recording apparatus in response to a reception of said prohibiting signal.

4. A data transfer control method executed between a recording apparatus, and a transfer control apparatus, which is connected to the recording apparatus in a manner capable of making a communication therebetween, and transferring to said recording apparatus data and managing information of said data, wherein said transfer control apparatus executes following steps of:
- (a1) transmitting to said recording apparatus a prohibiting signal to prohibit a connection state from being released prior to a transfer of the data,
- (b1) transmitting to said recording apparatus an allowing signal to allow to release said connection state when the transfer of the data is completed and a transfer of said managing information is also completed,
- (c1) starting a count of a predetermined time period at a time that the transfer of said data is ended,
- (d1) updating said managing information,
- (e1) determining that the transfer of said data is completed when said predetermined time period is counted, and
- (f1) instructing said recording apparatus to write the updated managing information, said recording apparatus executes following steps of:
- (a2) notifying of being impossible to cut-off said connection state in response to said prohibiting signal, and
- (b2) notifying of being allowed to cut-off said connection state in response to said allowing signal.

5. A data transfer control method according to claim 4, wherein
said transfer control apparatus and said recording apparatus are wire-connected or wireless-connected,
said step (a2) notifies of being impossible to detach a cable or a card-type expansion device attached to at least to one of said transfer control apparatus and said recording apparatus.

* * * * *